United States Patent
Tomosada

(10) Patent No.: US 7,764,879 B2
(45) Date of Patent: Jul. 27, 2010

(54) CONTROL APPARATUS AND IMAGING APPARATUS

(75) Inventor: Toshihiko Tomosada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 12/173,184

(22) Filed: Jul. 15, 2008

(65) Prior Publication Data
US 2009/0034956 A1    Feb. 5, 2009

(30) Foreign Application Priority Data
Jul. 30, 2007    (JP) .............................. 2007-197496

(51) Int. Cl.
  G03B 13/00   (2006.01)
  G03B 17/00   (2006.01)
(52) U.S. Cl. ......................................... 396/137; 396/76
(58) Field of Classification Search .................. 396/76, 396/79, 102, 103, 131, 137
See application file for complete search history.

(56) References Cited

U.S. PATENT DOCUMENTS 6,683,653 B1 *  1/2004  Miyake et al. .............. 348/373
2007/0300180 A1 * 12/2007  Hama et al. ................. 715/787
2007/0300187 A1 * 12/2007  Hama et al. ................. 715/830
2008/0147676 A1 *  6/2008  You .............................. 707/10

FOREIGN PATENT DOCUMENTS

JP    10-148751 A    6/1998

* cited by examiner

Primary Examiner—Rodney E Fuller
(74) Attorney, Agent, or Firm—Canon U.S.A., Inc. I.P. Division

(57) ABSTRACT

A control apparatus configured to control a control target in response to an operation by a user includes a first operation member configured to control the control target at a speed corresponding to an operation amount given by a user per unit time, a second operation member that is disposed in a position simultaneously operable by one and the same finger as the first operation member configured to control the control target at a predetermined speed in response to the operation by the user, and a control member configured to prioritize the operation of the first operation member over that of the second operation member when the first operation member and the second operation member are simultaneously operated.

6 Claims, 7 Drawing Sheets

CONTROL APPARATUS AND IMAGING APPARATUS

BACKGROUND OF THE INVENTION

1. Field of the Invention

The present invention relates to a control apparatus, for example, for controlling focus adjustment of an imaging apparatus performed by an operator, and an imaging apparatus equipped with the control apparatus.

2. Description of the Related Art

Conventionally, most imaging apparatuses such as a still camera and a video camera include a manual focus (MF) function of manually performing focus adjustment on an object. However, since resolution of an image is increased along with recent increase of a number of pixels of an image sensor and a high definition system, focus adjustment has to be more finely tuned when a focus is manually adjusted.

Conventionally, as an operation unit for the MF operation, a key switch that executes a key operation, a touch panel, and a rotation member such as a focus ring, a dial or a wheel have been produced.

Since only two kinds of operation amount, namely on and off, can be input by the key operation, the focus can be easily shifted at one stroke by continuously pressing the key. However, it is bothersome to perform fine focus adjustment since minute manipulation needs to be repeated for that purpose.

A ring, a wheel or the like can change the operation amount by a rotation amount and a rotation speed, so that they are suitable for the fine focus adjustment. However, if an amount of focus change responding to the operation amount is set small so as to enable the fine focus adjustment, the operation amount increases when the focus needs to be widely shifted. Consequently, it becomes difficult to quickly perform focus adjustment.

Accordingly, an ease-of-use operation unit is provided which includes both a key for rough focus adjustment and a wheel for fine focus adjustment and has advantages of both devices.

On the other hand, a recent imaging apparatus has been miniaturized in order to enhance portability. Thus, it is required to dispose a key and a wheel in an area as small as possible. Japanese Patent Application Laid-Open No. 10-148751 discusses an information input apparatus which includes a wheel and a key disposed within the wheel to decrease an area where the wheel and the key are disposed and enables performing of two types of operations with one finger.

The information input apparatus discussed in Japanese Patent Application Laid-Open No. 10-148751 enables one finger (e.g., right hand thumb) to operate both the key and the wheel. In this apparatus, in order to prevent making an unintentional operation by mistake, when any one of the key and the wheel is operated, another operation is neglected.

However, application of the above-described information input apparatus to the above-described MF operation causes a following problem. That is, if the key is unnoticeably operated by mistake at the same time that the wheel is operated to finely adjust focus, the operation of the wheel is neglected, so that an object is greatly out of focus and an MF operation cannot be performed as intended.

As described above, along with miniaturization of an imaging apparatus, a key and a wheel tend to be disposed within a small and narrow region. Thus, the above-described problem frequently occurs and operability of the MF becomes greatly impaired.

SUMMARY OF THE INVENTION

The present invention is directed to a control apparatus and an imaging apparatus which can make both fine and rough adjustments of an MF, and perform the MF operation intended by an operator even if a key and a wheel are simultaneously operated by mistake.

According to an aspect of the present invention, a control apparatus configured to control a control target in response to an operation by a user includes a first operation member configured to control the control target at a speed corresponding to an operation amount given by the user per unit time, a second operation member that is disposed in a position simultaneously operable by one and the same finger as the first operation member, configured to control the control target at a predetermined speed in response to the operation by the user, and a control member configured to prioritize the operation of the first operation member over that of the second operation member when the first operation member and the second operation member are simultaneously operated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
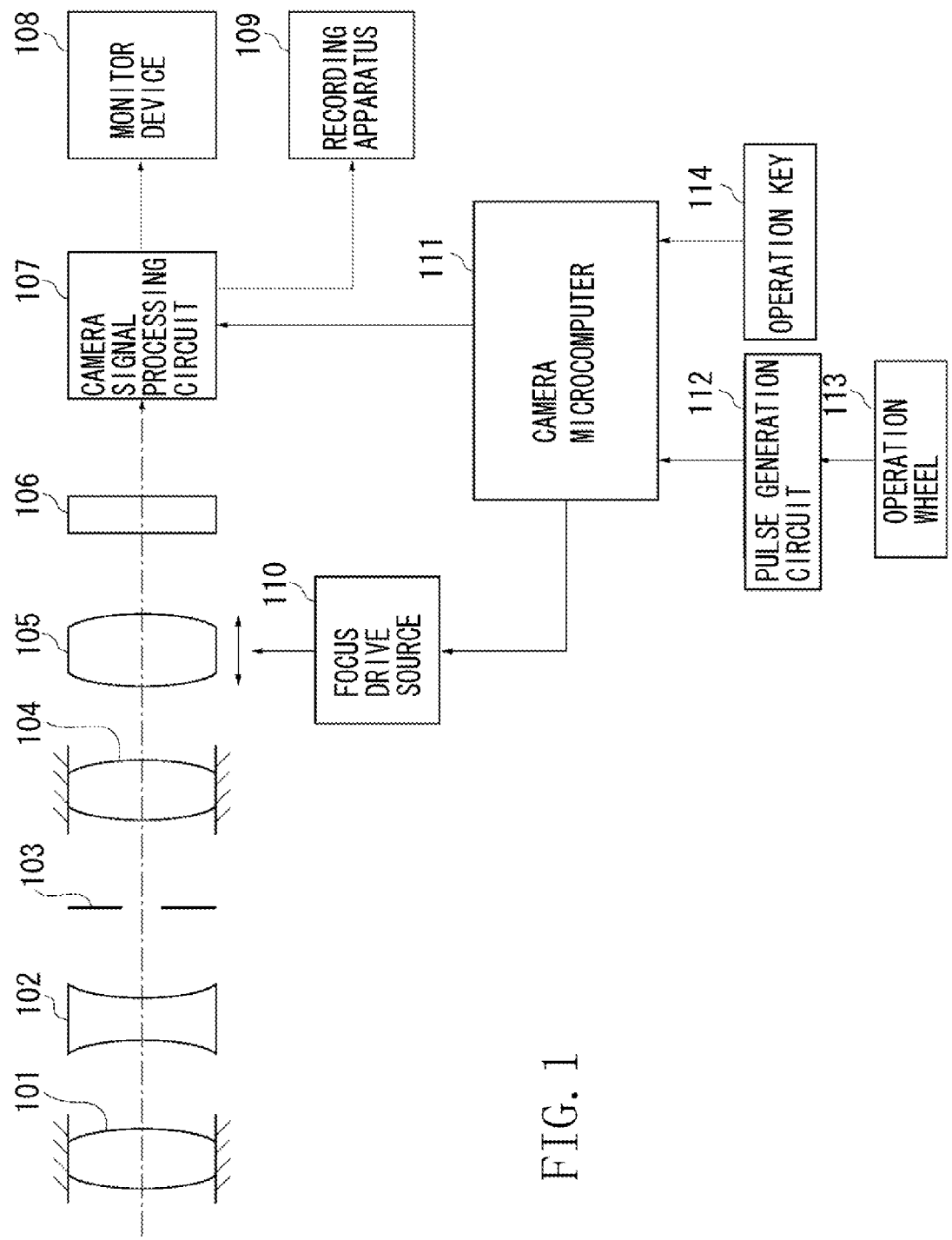
FIG. 1 is a diagram illustrating an example configuration of an imaging apparatus according to a first exemplary embodiment of the present invention.

FIG. 1 is a diagram illustrating an example configuration of an imaging apparatus (camera) according to a first exemplary embodiment of the present invention.

In FIG. 1, the imaging apparatus includes a first stationary lens unit 101, a zoom lens 102 for changing a magnification, a diaphragm 103, and a second stationary lens unit 104.

The imaging apparatus further includes a focus lens 105 (a focus adjustment lens unit of an image optical system) equipped with a focus adjustment function, an image sensor 106, a camera signal processing circuit 107, a monitor device 108, a recording apparatus 109, a focus drive source 110 for driving the focus lens 105, a camera microcomputer 111, and a pulse generation circuit 112. The imaging apparatus further includes an operation wheel (a first operation member) 113 and an operation key (second operation member) 114.

The camera signal processing circuit 107 converts an output signal of the image sensor 106 into a signal corresponding to the monitor device 108 having a display function and the recording apparatus 109. The monitor device 108 displays a video signal which is converted by the camera signal processing circuit 107, and has an information display function of displaying information such as image capture information and operation information. The recording apparatus 109 records a moving image and a still image and uses a magnetic tape and a semiconductor memory as a recording medium.

The camera microcomputer 111 controls the focus drive source 110 in response to an operation amount of the operation wheel 113 and the operation key 114, and controls an output signal of the camera signal processing circuit 107.

The camera microcomputer 111 is connected with the operation wheel 113 and the operation key 114 to move the focus lens 105 in a closest distance direction or an infinity distance direction. An operator can perform the MF operation by operating the operation wheel 113 or the operation key 114.

The operation wheel 113 is connected with the pulse generation circuit 112 for generating a pulse in response to its rotation amount, rotation speed, and rotation direction. The camera microcomputer 111 detects a pulse generated when the operation wheel 113 is operated, and determines a drive direction and a drive speed of the focus lens 105 in response to a detected pulse.

The operation key 114 has a switch mechanism that allows a press operation (a switch mechanism capable of determining on and off states of input). The camera microcomputer 111 drives the focus drive source 110 to move the focus lens 105 in the closest distance direction or the infinity distance direction in response to a pressed switch.

In the operation wheel 113, the operation amount by which a control amount of the control target focus lens 105 is input, is variable. Further, the operation amount of the operation key 114 is fixed.

Figure 2:
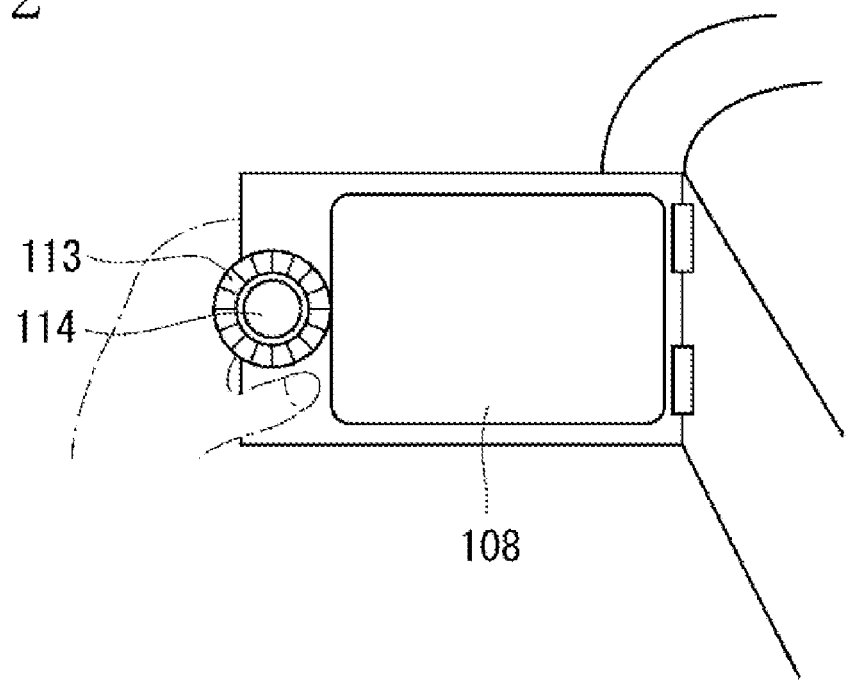
FIG. 2 is a diagram illustrating a relation in arrangement between an operation wheel and an operation key in FIG. 1.

FIG. 2 is a diagram illustrating the arrangement of the operation wheel 113 and the operation key 114 in FIG. 1.

In the present exemplary embodiment, the operation wheel 113 is disposed to a side of the monitor device 108 such as a liquid crystal display. The monitor device 108 is attached to the main body of the imaging apparatus by hinges or the like. The monitor device 108 has a mechanism that can open leftward. The operation wheel 113 is provided at a position where an operator can operate with his/her left thumb when holding the main body by the right hand (shown in dot-dash lines).

The operation wheel 113 has a rotation mechanism having a rotation axis in a direction orthogonal to the monitor device 108. In the present exemplary embodiment, the operation wheel 113 is configured to drive the focus lens 105 in the infinity distance direction when the operation wheel 113 is rotated rightward and in the closest distance direction when the operation wheel 113 is rotated leftward.

The correspondence between the rotation direction of the operation wheel 113 and the drive direction of the focus lens 105 may be changed over as required.

Figure 3:
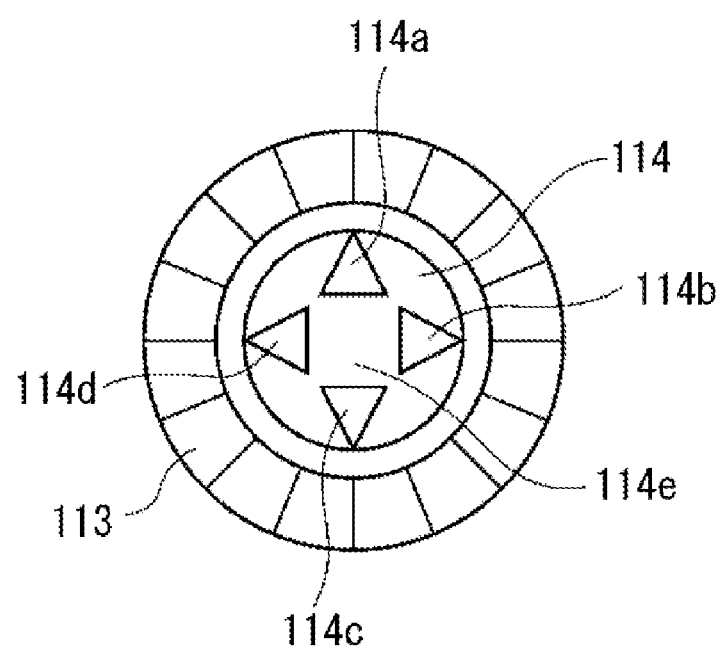
FIG. 3 is a diagram illustrating details of the operation key in FIG. 2.

Further, the operation key 114 is disposed inside the operation wheel 113. As shown in FIG. 3, the operation key 114 includes operation key switches 114a, 114b, 114c and 114d and the input position of these keys are displaced at 90 degree angles each other in a cross direction, and an operation key switch 114e located in a center part. The operation key 114 can be operated with the left thumb when the operator is holding the main body of the imaging apparatus with the right hand similar to the operation wheel 113.

The present exemplary embodiment is configured such that when the operation key switch 114b is pressed, the focus lens 105 is driven in the infinity distance direction. When the operation key switch 114d is pressed, the focus lens 105 is driven in the closest distance direction. In the present exemplary embodiment, the MF operation is performed using only the operation key switches 114b and 114d in a horizontal direction.

However, as an embodiment different from the present exemplary embodiment, the MF operation may also be performed using the operation key switches 114a and 114c in a vertical direction. The MF operation may be changed over to other operations such as an auto-focus (AF) function of automatically adjusting the focus by pressing the operation key switch 114e in the center part.

Figure 4:
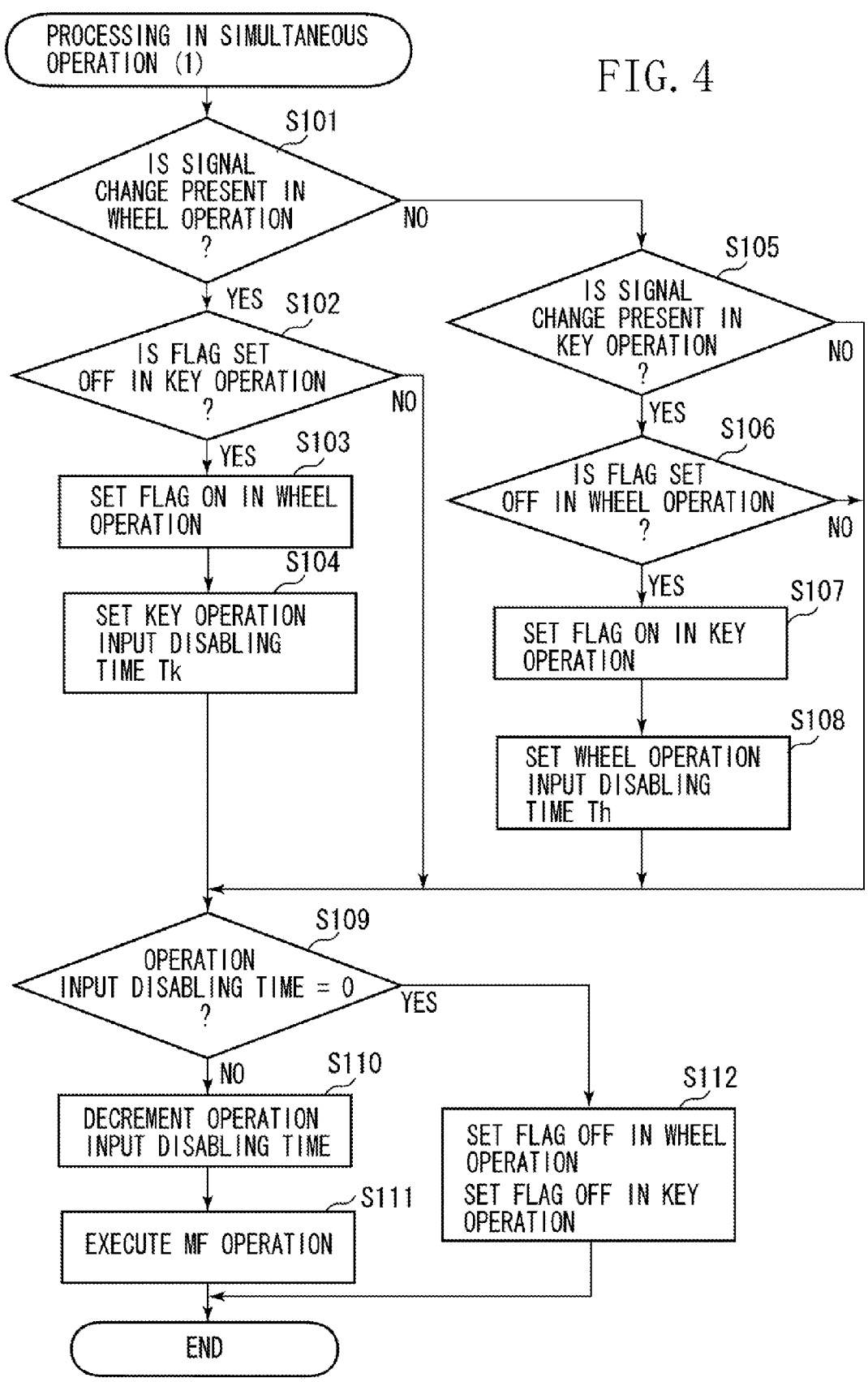
FIG. 4 is a flowchart illustrating procedures of a simultaneous operation of the operation wheel and the operation key executed by the imaging apparatus in FIG. 1.

FIG. 4 is a flowchart illustrating procedures of a simultaneous operation of the operation wheel 113 and the operation key 114 executed by the imaging apparatus in FIG. 1.

More specifically, in the flowchart of FIG. 4, an input of the operation wheel 113 is prioritized when the operation wheel 113 and the operation key 114 are simultaneously operated.

In FIG. 4, first, in step S101, the camera microcomputer 111 determines whether the operation wheel 113 is operated and a signal change is present. If the signal change is present (YES in step S101), the processing proceeds to step S102. If the signal change is not present (NO in step S101), the processing proceeds to step S105.

In step S102, the camera microcomputer 111 determines whether a flag indicating the operation of the operation key 114 is off. If the flag is off, which indicates that the operation key 114 is not operated (YES in step S102), the processing proceeds to step S103. If the flag is on, which indicates that the operation key 114 is operated (NO in step S102), the processing proceeds to step S109.

In step S103, the camera microcomputer 111 sets a flag indicating that the operation wheel 113 is operated on. In step S104, the camera microcomputer 111 sets time Tk during which an input operation from the operation key 114 is disabled. Then, the processing proceeds to step S109.

In step S105, the camera microcomputer 111 determines whether the operation key 114 is operated and a signal change is detected. If the signal change is detected (YES in step S105), the processing proceeds to step S106. If the signal change is not detected (NO in step S105), the processing proceeds to step S109.

In step S106, the camera microcomputer 111 determines whether a flag indicating the operation of the operation wheel 113 is off. If the flag is off, which indicates that the operation wheel 113 is not operated (YES in step S106), the processing proceeds to step S107. If the flag is on, which indicates that the operation wheel 113 is operated (NO in step S106), the processing proceeds to step S109.

In step S107, the camera microcomputer 111 sets a flag on which indicates that the operation key 114 is operated. The processing proceeds to step S108. In step S108, the camera microcomputer 111 sets time Th during which an input operation from the operation wheel 113 is disabled. Then, the processing proceeds to step S109.

Herein, the time Th during which the input operation from the operation wheel 113 is disabled is set to a smaller value than the time Tk set in step S104. An input signal from key operation is continuously in an on-state during the key is pressed. On the other hand, as to an input signal from wheel operation, the time Th during which the input operation from the operation wheel 113 is disabled needs to be set to a small value since a pulse signal is only intermittently transmitted even during the wheel is rotated.

Further, when chattering which repeats intermittence of an input signal due to a noise or the like, occurs during the input operation of the operation key 114, the time Tk is set to receive the input operation from the operation key 114. The time Tk during which the input operation from the operation key 114 is disabled is set longer than the time Th during which the input operation from the operation wheel 113 is disabled, so that the operation of the operation wheel 113 is prioritized over the operation of the operation key 114.

In step S109, the camera microcomputer 111 determines whether the time Tk or the time Th set in step S104 or step S108 is zero. If it is not zero (NO in step S109), in step S110, the camera microcomputer 111 decrements the time Tk or the time Th. Then, the processing proceeds to step S111.

In step S109, if the time Tk or the time Th is zero (YES in step S109), in step S112, the camera microcomputer 111 sets the flag indicating that the operation wheel 113 is operated and the flag off which indicates that the operation key 114 is operated. Then, the processing ends.

In step S111, the camera microcomputer 111 drives the focus lens 105 and executes the MF operation in response to the operation of the operation wheel 113 or the operation key 114. Then, the processing ends. The camera microcomputer 111 executes these flows of the processing for every predetermined time, for example, by synchronizing with a vertical synchronizing signal of a video picture.

Figure 5:
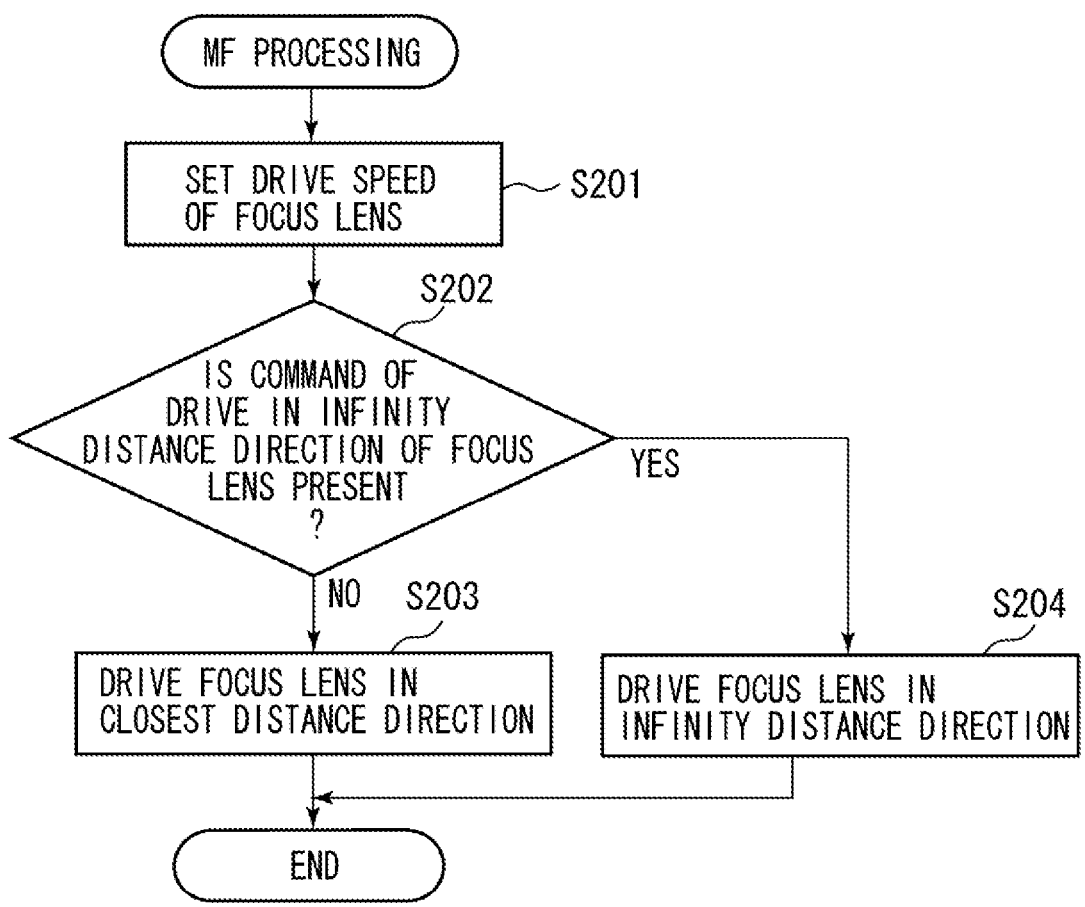
FIG. 5 is a flowchart illustrating procedures of MF processing (MF operation) performed in step S111 of the flowchart in FIG. 4.

FIG. 5 is a flowchart illustrating procedures of the MF processing (the MF operation) performed in step S111 in FIG. 4.

In FIG. 5, in step S201, the camera microcomputer 111 sets the drive speed of the focus lens 105. When the input of the operation wheel 113 is received, the camera microcomputer 111 sets the drive speed corresponding to the rotation speed of the operation wheel 113. Further, if the input of the operation key 114 is received, the camera microcomputer 111 sets a predetermined fixed speed. Here, the drive speed of the focus lens 105 is set by the key operation to a larger value than the drive speed set by the wheel operation to enable a rough adjustment of the MF.

In step S202, the camera microcomputer 111 determines whether the drive direction of the focus lens 105 is in the infinity distance direction.

In the present exemplary embodiment, as described above, when the operation wheel 113 is rotated rightward or the operation key 114 is operated in a right direction, the camera microcomputer 111 sets the focus lens 105 to be driven in the infinity distance direction. Further, when the operation wheel 113 is rotated leftward or the operation key 114 is operated in a left direction, the camera microcomputer 111 sets the focus lens 105 to be driven in the closest distance direction.

If a drive direction command of the focus lens 105 is in the closest distance direction (NO in step S202), the processing proceeds to step S203. If the drive direction command of the focus lens 105 is in the infinity distance direction (YES in step S202), the processing proceeds to step S204. In step S203, the camera microcomputer 111 drives the focus lens 105 in the closest distance direction by the focus drive source 110. In step S204, camera microcomputer 111 drives the focus lens 105 in the infinity distance direction by the focus drive source 110.

If the processing is performed as described above, the MF operation that prioritizes the wheel operation can be performed even if the operation wheel 113 for fine adjustment and the operation key 114 for rough adjustment are simultaneously operated by mistake. As a result, an operator can perform an intended MF operation without causing an object to be greatly out of focus.

Second Exemplary Embodiment

Figure 6:
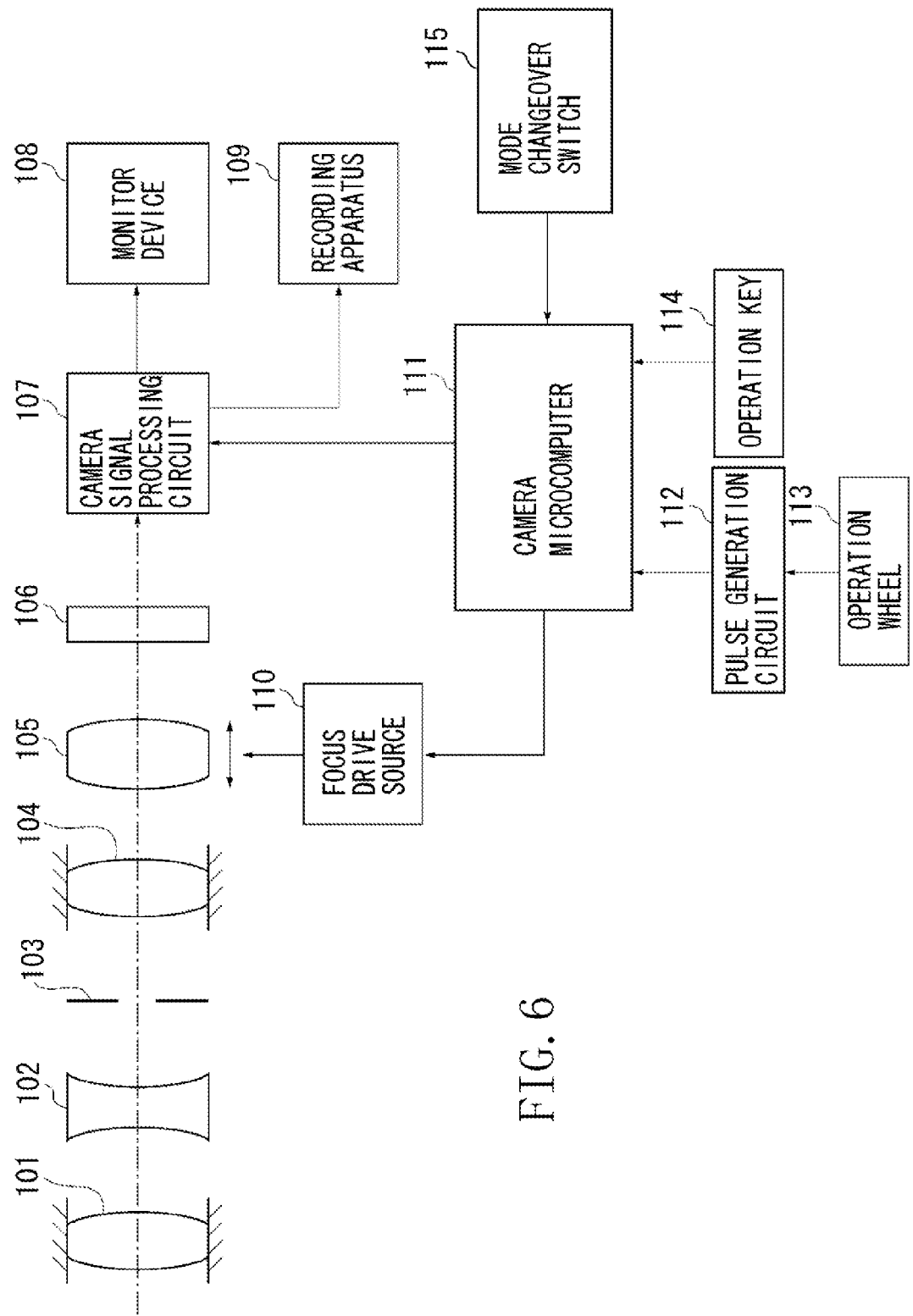
FIG. 6 is a diagram illustrating an example configuration of an imaging apparatus according to a second exemplary embodiment of the present invention.

FIG. 6 is a diagram illustrating a configuration of an imaging apparatus according to a second exemplary embodiment of the present invention.

The imaging apparatus according to the second exemplary embodiment includes a mode changeover switch 115 for changing over a control target by the wheel operation and the key operation in addition to the configuration of the imaging apparatus in the first exemplary embodiment. Other configurations are similar to the first exemplary embodiment and are denoted with the same reference numeral.

Figure 7:
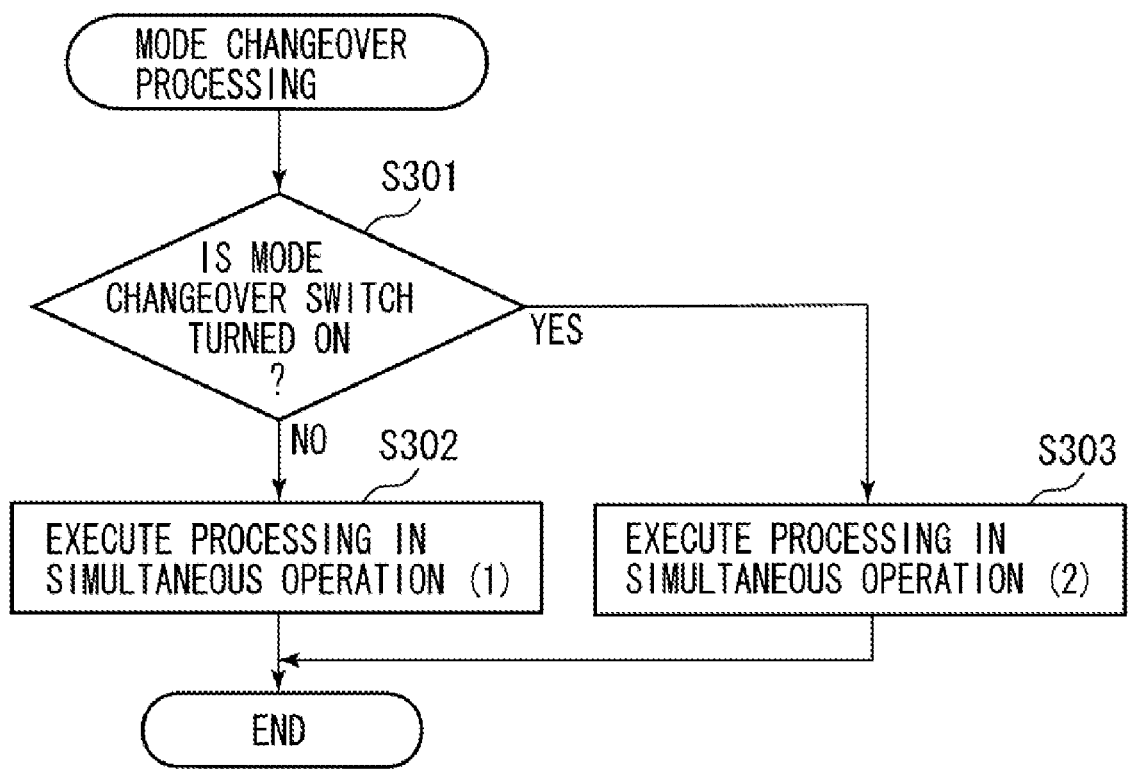
FIG. 7 is a flowchart illustrating procedures of mode changeover processing executed by the imaging apparatus in FIG. 6.

FIG. 7 is a flowchart illustrating procedures of mode changeover processing to be executed by the imaging apparatus shown in FIG. 6.

In FIG. 7, in step S301, the camera microcomputer 111 determines whether the mode changeover switch 115 is turned on. If the mode changeover switch 115 is not turned on (NO in step S301), the processing proceeds to step S302. If the mode changeover switch 115 is turned on (YES in step S301), the processing proceeds to step S303.

In step S302, the camera microcomputer 111 executes the processing for prioritizing the operation wheel input (processing in the simultaneous operation (1)) according to the first exemplary embodiment shown in FIG. 4. Further, in step S303, the camera microcomputer 111 executes a menu operation (processing in the simultaneous operation (2)) of executing shift of a menu item or selection of a menu item. The detail of the menu operation mode is described below.

Figure 8:
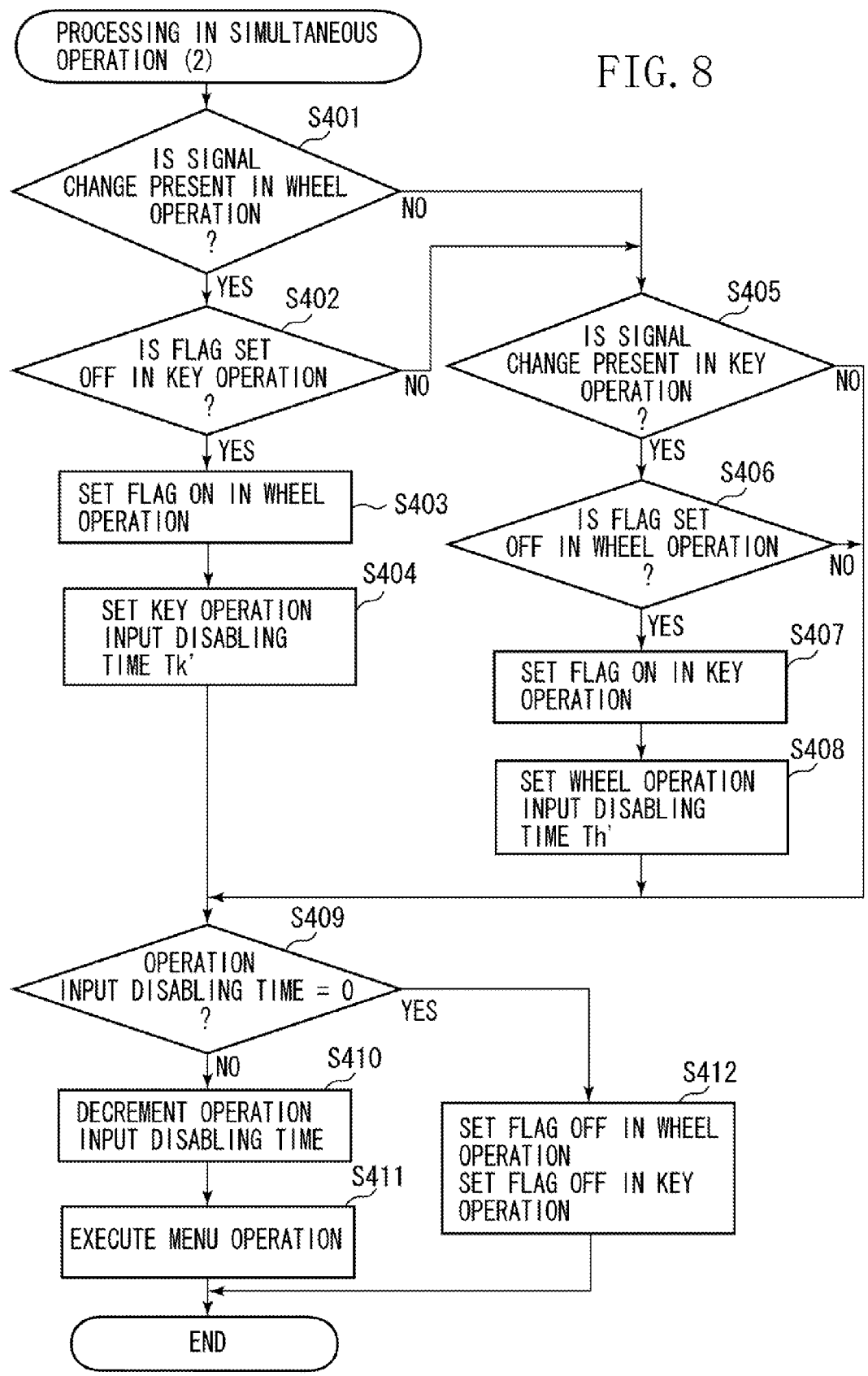
FIG. 8 is a flowchart illustrating procedures of a simultaneous operation of the operation wheel and the operation key executed by the imaging apparatus in FIG. 6.

FIG. 8 is a flowchart illustrating procedures of the simultaneous operation of the operation wheel 113 and the operation key 114 executed by the imaging apparatus shown in FIG. 6.

More specifically, FIG. 8 is the flowchart when both the operation wheel 113 and the operation key 114 are operated in the menu operation mode. Steps S401 to S412 respectively correspond to steps S101 to S112 of the first exemplary embodiment shown in FIG. 4. Thus, the similar processing shall be executed.

However, in the second exemplary embodiment, in order to receive the operation which is earlier operated between the wheel operation and the key operation in priority to the other operations, a transition destination of determination in step S402 is different from the first exemplary embodiment.

In step S402, the camera microcomputer 111 determines whether a flag indicating the operation of the operation key 114 is off. If the flag is off, which indicates that the operation key 114 is not operated (YES in step S402), the processing proceeds to step S403. If the flag is on, which indicates that the operation key 114 is operated (NO in step S402), the processing proceeds to step S405.

In step S405, the camera microcomputer 111 determines whether a signal change by the key operation is detected. If the signal change is detected (YES in step S405), the processing proceeds to step S406.

If the signal change by the key operation is not detected (NO in step S405), the processing proceeds to step S409. In step S402 and step S406, the camera microcomputer 111 determines each operation state of the operation wheel 113 and the operation key 114 to enable exclusively disabling of the other operation. Thus, the camera microcomputer 111 receives an input that is earlier operated.

Further, in step S104 and step S108 of the first exemplary embodiment shown in FIG. 4, the time Tk during which the input operation from the operation key 114 is disabled and the time Th during which the input operation from the operation wheel 113 is disabled are set to Tk>Th. However, in the processing of the second exemplary embodiment shown in FIG. 8, in order to make each priority equal, Tk' and Th' set in step S404 and step S408 are set to Tk'=Th'.

In step S411, the camera microcomputer 111 executes the menu operation such as a menu selection in response to the operation of the operation wheel 113 or the operation key 114. Then, the processing ends. In the menu operation, the camera microcomputer 111 executes changeover of the transfer direction of the menu item corresponding to the rotation direction of the operation wheel 113 or transfer of the menu item corresponding to the input position of the operation key 114. The camera microcomputer 111 executes these flows of the processing for every predetermined time, for example by synchronizing with a vertical synchronizing signal of a video picture similar to the first exemplary embodiment.

When the processing is performed as described above, the changeover can be carried out between a mode of prioritizing the wheel operation and a mode of prioritizing the operation earlier operated. If the latter mode is selected, an operator can perform the menu operation without being aware which operation unit is operated.

The description according to the present exemplary embodiment, the MF operation mode (first mode) is set as the mode of prioritizing the wheel operation and the menu operation mode (second mode) is set as the mode of prioritizing the operation which is earlier operated. However, the setting is not limited to these two modes. Image capture information, for example, exposure compensation of an object, selection of focusing points or the like may be set. Further, the present invention can be applied to zoom control instead of focus control. In this case, a control target is not a focus lens but a zoom lens.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-197496 filed Jul. 30, 2007, which is hereby incorporated by reference herein in its entirety.

What is claimed is:

1. A control apparatus configured to control a control target in response to an operation by a user, the control apparatus comprising:

a first operation member configured to control the control target at a speed corresponding to an operation amount given by the user per unit time;

a second operation member that is disposed in a position simultaneously operable by one and the same finger as the first operation member, configured to control the control target at a predetermined speed in response to the operation by the user; and a control member configured to prioritize the operation of the first operation member over that of the second operation member when the first operation member and the second operation member are simultaneously operated.

2. The control apparatus according to claim 1, wherein the first operation member includes a rotation mechanism that rotates about a rotation axis, and inputs the operation amount based on a pulse generated by a rotation amount, a rotation speed and a rotation direction.

3. The control apparatus according to claim 2, wherein the second operation member is disposed inside the rotation mechanism of the first operation member.

4. The control apparatus according to claim 1, wherein the second operation member includes a switch mechanism capable of determining an on-or an off-state of an input, and inputs the operation amount based on the on-or the off-state of the switch mechanism.

5. The control apparatus according to claim 1, further comprising a changeover member configured to change over the control target, wherein the control member selects a first mode which prioritizes the operation of the first operation member and a second mode which prioritizes the operation of a previously operated operation member corresponding to the selected control target by the changeover member when the first operation member and the second operation member are simultaneously operated.

6. An imaging apparatus comprising a control apparatus according to claim 1, wherein the control target includes a focus adjustment lens unit of an image optical system.

* * * * *